INVENTOR.
ARTHUR W. GOLDSTEIN
BY Bosworth, Sessions,
Herrstrom & Williams
ATTORNEYS

INVENTOR.
ARTHUR W. GOLDSTEIN

INVENTOR.
ARTHUR W. GOLDSTEIN
ATTORNEYS

United States Patent Office 2,928,239
Patented Mar. 15, 1960

2,928,239

IMPELLED CHARGE GAS EXPLOSION TURBINE WITH CONSTANT VOLUME, PRESSURE RAISING COMBUSTION CHAMBERS

Arthur W. Goldstein, Elyria, Ohio

Application March 16, 1954, Serial No. 416,507

12 Claims. (Cl. 60—39.02)

This invention relates to explosion gas turbines.

Practically all modern gas turbines are combustion turbines, known more accurately and fully as constant-pressure, constant-combustion turbines. They are of relatively recent development, have received a great deal of attention recently and have found their greatest use in jet-propelled aircraft. The basic components of a combustion turbine are a compressor, a combustion chamber and a turbine. The compressor and turbine are generally mounted on the same shaft. Air is drawn into the turbine, passes through the compressor and is delivered to the combustion chamber into which fuel is also introduced. The fuel mixture is burned smoothly and continuously. The combustion products are first led to the turbine where they do work and are then exhausted to the atmosphere. The continuous combustion takes place substantially at the delivery pressure of the compressor. The inlet and outlet ports of the combustion chamber are open at all times, there is no explosion, and no substantial rise in pressure within the combustion chamber.

Prior explosion gas turbines may be classified as either open or closed chamber explosion turbines.

In open-chamber explosion turbines the explosion occurs in a chamber that has an open exhaust port or nozzle and the combustion gases act not against an exhaust valve but against a column of gas and their own inertia. Expansion of the volume of the gases begins before there is a substantial rise in pressure and both the pressure and volume change while the heat is being introduced into the gas.

For example, the early open-chamber explosion turbines did not have a compressor for forcing the air into the chamber nor an outlet valve for closing the outlet port. In such a turbine the combustion chambers were provided with an inlet valve, a water jacketed inlet end, a sparking plug, and an open outlet port or nozzle which directed the combustion gases against the turbine. The fuel and air were mixed together prior to entering the combustion chamber. The turbine was started by closing a valve in the air line and blowing a blast of air through the fuel inlet into the combustion chamber. The air carried with it sufficient fuel to form an explosive mixture. The charge was ignited and the combustion gases exhausted through the nozzle against the turbine. At the instant of the ignition the air valve was opened and the charging was thereafter automatic. This resulted from a slight pressure rise, in the explosion chamber following ignition, which was not dissipated immediately due to the inertia of the gas in the nozzle. Once the combustion gases began moving down and out of the open nozzle the pressure at the inlet end of the chamber would first drop to that of the atmosphere and then because of the continuing flow of combustion gases, to a pressure below atmospheric. This negative pressure or partial vacuum was made larger by the water jacket simultaneously cooling the inlet end of the chamber and causing the gases remaining therein to contract. Because of the partial vacuum the outside air pressure would open the inlet valve and a fresh charge would flow into the explosion chamber. The duration of the partial vacuum was sufficiently short so that the inertia of the gases in the nozzle was not overcome and the direction of flow thereof reversed. After a period of operation the nozzle became hot enough to ignite the successive charges and the spark plug was turned off.

Other prior open chamber explosion turbines included combustion chambers having inlet and outlet ports, a compressor or source of air under pressure, an inlet port valve and a valve for closing the outlet port during the charging of the chamber. In operation the outlet valve was closed, and the charging completed whereupon the inlet valve was closed, and the charge ignited. The outlet port was opened just prior to, at, or just after the instant of the explosion and the expanding combustion gases were exhausted from the chamber against the turbine blades as soon as the inertia of the gases could be overcome and the flow started and before the pressure within the chamber rose substantially. When the combustion gases had been substantially completely exhausted the outlet valve was closed and the cycle repeated. Open chamber explosion turbines have not attained a high efficiency as their peak operating pressure has been relatively low.

The closed or constant volume explosion turbine includes the same basic components as the combustion turbine, namely a compressor or source of air under pressure, one or more combustion chambers and a turbine. Each combustion chamber has inlet and outlet valves. The cycle is similar to that of the latter above described open chamber explosion turbine except that after ignition of the fuel mixture within the chamber both valves remain closed until the pressure rise within the chamber is substantially completed, whereupon the outlet valve opens and the combustion gases exhaust at high velocity either against the turbine blades or into a conduit leading to a turbine. When the pressure within the chamber drops substantially to that of the atmosphere the outlet valve closes, the inlet valve opens and the cycle is repeated.

Various attempts have been made to increase the efficiency of explosion turbines by using the exhaust gases issuing from the explosion chambers to compress the new charge entering the chamber. These often involved the use of valves, auxiliary chambers, conduits and/or aerodynamically inefficient blade designs with resultant loss of pressure through current eddies, inefficient flow surface friction and leakage.

Additionally explosion turbines have been characterized by intermittent flow of charge into the combustion chamber, the intermittent ignition of the fuel mixture within the combustion chamber and the intermittent motivation of the turbine by the combustion products as they are exhausted from the combustion chamber.

In the early days the problems of the combustion turbine presented many difficulties and caused considerable attention to be devoted to the mechanically more complicated explosion turbines. However, despite repeated efforts and although a number of explosion turbines were built, none of them attained their calculated thermal efficiency or even an economic percentage thereof and none has had significant commercial success. In fact lack of success in producing a satisfactory explosion turbine was so pronounced that efforts to provide a satisfactory one virtually terminated with the development of improved internal combustion engines, and, more recently, with the development of successful combustion turbines.

It is therefore a general object of my invention to provide an explosion turbine of improved design and construction which will have increased power output per unit of engine weight and/or volume and which will have increased an advantageous thermal efficiency and which will have commercial usefulness. It is a further general object of my invention to provide an explosion gas turbine which may be used as a power turbine itself or from which the combustion products may be led to a second power turbine. It is a further general object of my invention to provide an explosion gas turbine wherein combustion is essentially a constant volume process. It is a further object of my invention to provide an explosion gas turbine having a closed explosion chamber in which combustion will be substantially completed as a constant volume process and from which there will be no exhaustion of the combustion gases until a substantially maximum obtainable pressure has been reached at the outlet port. It is a further object of my invention to provide an explosion gas turbine having principles and modes of operation and design which may be useful for turbines of both high or low wheel speed and small or large size. It is a further object of my invention to provide an explosion gas turbine having a stator the entire periphery of which is a series of adjacent combustion chambers. It is a further object of my invention to provide a gas explosion turbine having combustion chambers which are designed to smoothly receive and discharge the gases from and to the rotors. It is a further object of my invention to provide a gas explosion turbine having combustion chambers which may have their inlet and/or outlet ports opening toward or parallel with the axis of rotation or in any convenient direction. It is a further object of my invention to provide an explosion gas turbine having improved inlet and outlet valve rotors. It is a further object of my invention to provide an explosion gas turbine wherein the combustion chamber inlet valve is integral with the centrifugal compressor which charges the combustion chambers. It is a further object of my invention to provide an explosion gas turbine having a multipassage inlet valve rotor in which flow is continuous and unobstructed. It is a further object of my invention to provide an explosion gas turbine capable of operation at rotor tip speeds of a magnitude such that combustion and explosion of the fuel mixture may no longer be viewed as instantaneous for rotors of small size and therefore of high rotative speeds. It is a further object of my invention to provide an explosion gas turbine in which the time-steady flow of gases in the induction rotor valve is changed to pulsating flow within the combustion chambers. It is a further object of my invention to provide an explosion gas turbine having principles of operation such that the fuel mixture may be either intermittently or continuously ignited, depending on the relationship between cycle period and duration of combustion.

It is a further object of my invention to provide an explosion gas turbine wherein the charge entering each combustion chamber may be stratified so as to have at least a stratum of a substantially stoichiometric mixture of air and fuel and a stratum or strata of air, whereby the operating temperature of the turbine may be controlled without impairing the efficient, rapid and complete burning of the fuel. It is a further object of my invention to provide an explosion gas turbine wherein the charge will be impelled into the explosion chamber at high velocity and stopped therein intermittently by the action of the exhaust valve and the resulting "ram" effect will be utilized to increase the maximum pressure obtained from each combustion cycle and to avoid the losses entailed in a continuous diffusion process. It is a further object of my invention to provide an explosion gas turbine wherein the design and timing will be such as to utilize the pressure waves within the combustion chambers to increase the efficiency of the turbine. It is a further object of my invention to provide an explosion gas turbine having an exhaust valve rotor which will convert the pulsating flow of the exhaust gases leaving the combustion chambers into a substantially steady flow.

It is a further object of my invention to provide a gas explosion turbine in which the flow of gases within the impeller will be simple, steady, direct and unrestricted. It is a further object of my invention to provide a gas explosion turbine in which the exhaust valve rotor blades will receive substantially steady torque from the combustion gases as they are exhausted from the respective combustion chambers. It is a further object of my invention to provide an explosion gas turbine in which the flow of gases will be substantially unidirectional and unrestricted except within the combustion chambers while the same are being charged.

These and other objects and/or advantages of my invention will appear from the following description and the appended drawings in which:

Figure 6 is a schematic longitudinal section of a turbine embodying a modified form of my invention.

Figure 1:
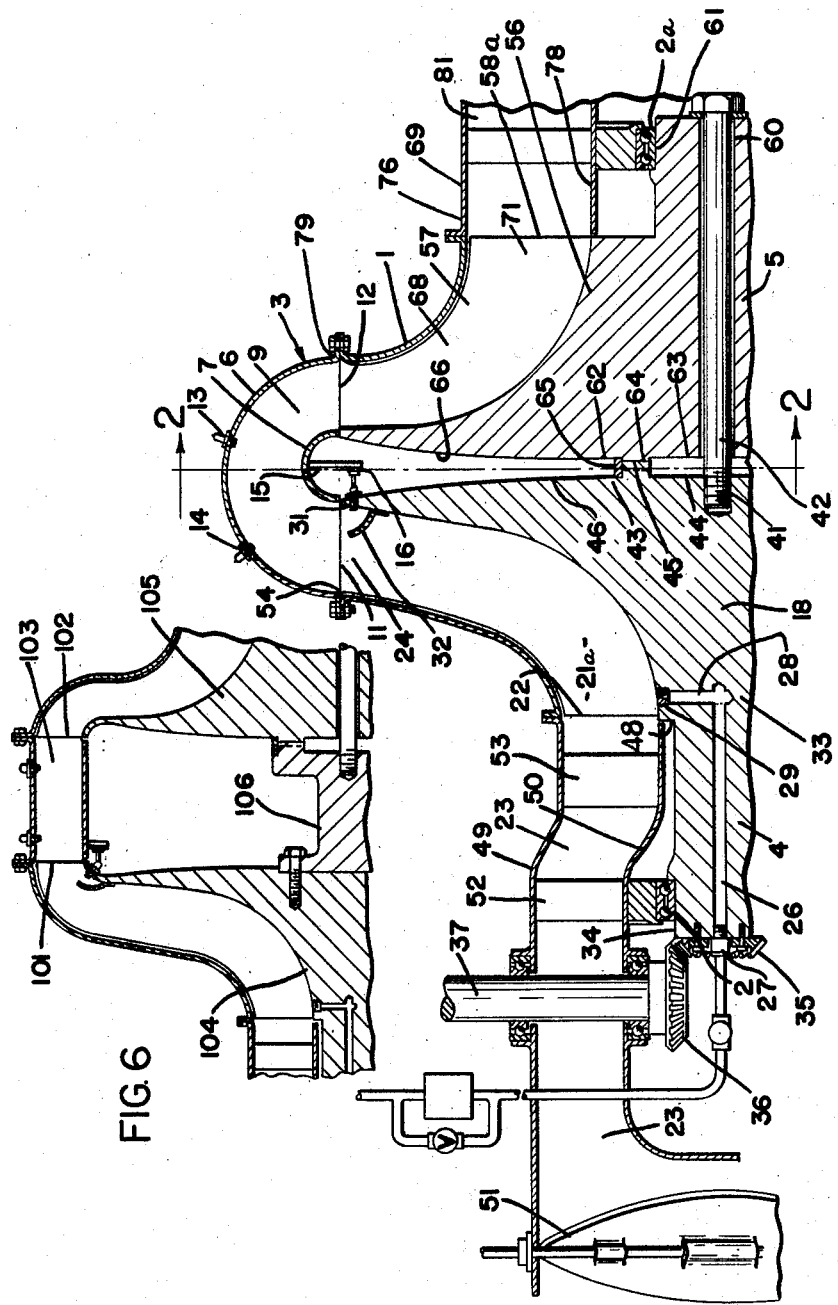
Figure 1 is a schematic longitudinal section of the upper half of a turbine embodying my invention.
Figure 2:
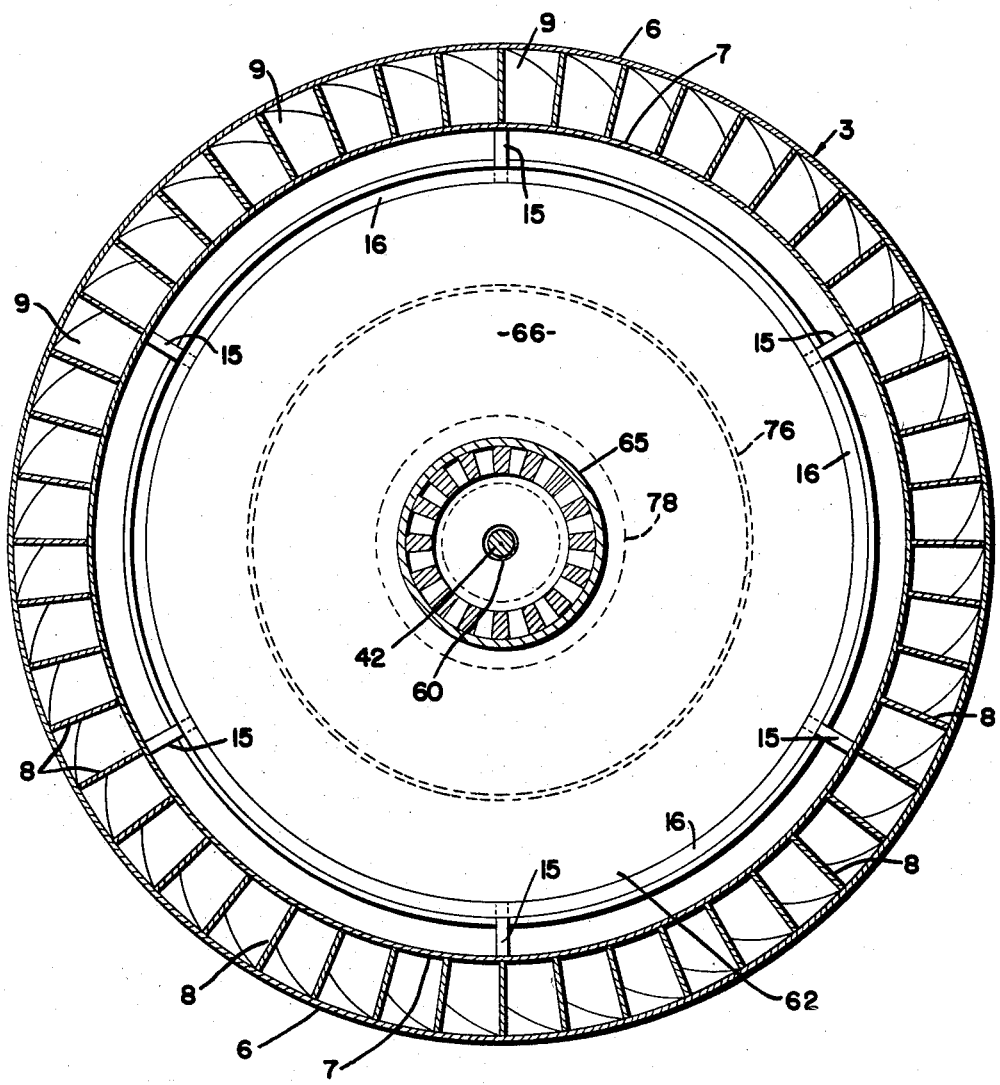
Figure 2 is a transverse section of a turbine embodying my invention along the line 2—2 of Figure 1.

A gas explosion turbine embodying a preferred form of my invention comprises a housing 1, Figure 1, within which are suitably mounted an induction valve rotor 4, a stator 3 and an exhaust valve rotor 5. The stator is preferably substantially ring shaped and is provided throughout its arcuate length with a continuous series of adjacent substantially transversely extending combustion chambers 9, Figure 2. The rotors are axially aligned and rotate in fixed relation to each other. The induction valve rotor preferably is also an impeller and compressor and impels the charge into each combustion chamber, causing the charge within each combustion chamber to be stratified. When each combustion chamber is charged, the explosion is obtained or completed therein, both the inlet and outlet ports 11 and 12 respectively of the combustion chamber remaining closed until the combustion is completed substantially as a constant volume process and the pressure at the outlet port has substantially reached its maximum value after which time the outlet port opens and the combustion products are exhausted. The inlet port continues to remain closed until the pressure at the inlet port is low enough to permit the influx of gases from the induction rotor at which time the port is opened and charging commences. After closing of the outlet port and completion of the charging the inlet port is closed and the cycle repeated. The novel arrangement and design of the parts, and combination of parts, the timing of the cycle, and operation of the turbine is such that the pressure waves resulting from the opening and closing of the inlet and outlet ports and the flow of gases within the combustion chamber will be utilized to increase the maximum pressure of each cycle and therefore the overall efficiency of the turbine.

For turbines having a short aerodynamic or cycle period compared with time for combustion and explosion, the charge may be continuously ignited in the induction valve rotor before it is impelled into the respective combustion chambers wherein the explosion is obtained.

Referring then to Figure 1, a turbine embodying the preferred form of my invention comprises a radially symmetrical stationary outer case or housing 1 which may be supported in any conventional manner. The housing is provided at both the inlet and outlet ends with axially aligned bearings 2 and 2a. Supported within the housing is a ring shaped stator 3 the features and functions of which will hereinafter be more fully described. Also within the housing and journalled on the respective bearings are an induction valve rotor 4 and an exhaust valve rotor 5. These rotors are arranged so as to turn in fixed relation with each other when the turbine is in operation.

Figure 3:
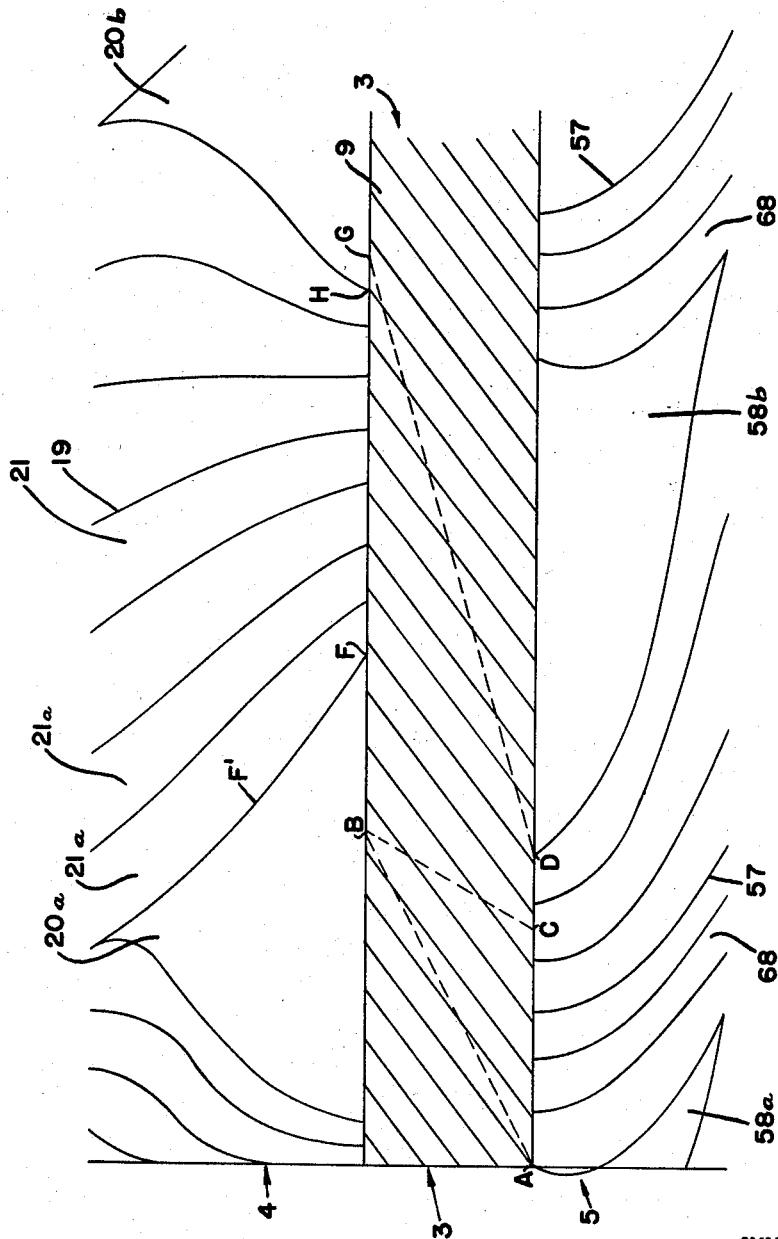
Figure 3 is a schematic unrolled view of the rotors and stator along the arcuate length of one cycle.

The stator 3 is secured to the housing and comprises an outer member 6, which may be the housing itself, an inner member 7 and a series of vanes 8 (Figure 2) which define combustion chambers 9. A sufficient number of combustion chambers is provided to prevent an excessive difference in cycle phase between adjacent chambers. This aids in maintaining pressure differences between various elements of the gas in the different phases of the cycle and minimizes cross-flow losses across the chamber and leakage between chambers. The inlet and outlet ports 11 and 12 (Figure 1), respectively, of the combustion chambers are oriented to receive the charge from the induction rotor and to discharge the combustion gases to the exhaust rotor in a smooth efficient manner. The vanes 8 are oriented so as to be essentially parallel with the direction of flow of the charge as it enters the combustion chamber at optimum inflow velocity and so as to discharge the combustion products as a turbine nozzle with a sufficient rotational velocity component to obtain the desired work output at an assured turbine speed without having an excessive discharge whirl component of velocity. Additionally the vanes 8 are preferably so oriented within the stator that the cross-sectional area normal to the direction of flow of each combustion chamber 9 is constant throughout the length of the chamber (Figure 3). The outlet port 12 of each explosion chamber is preferably and conveniently angularly advanced with relation to the inlet port 11 in the direction of rotation of the turbine so as to provide a simple smooth shape for the chamber.

Each combustion chamber is preferably provided with spark plugs 13 and 14 which are connected in a conventional manner with respective sparking coils and timers (not shown). These plugs are used to ignite the charge when operation of the turbine is commenced or when it is operated at low speeds or is of large size as will hereinafter be more fully explained. Secured to the inner side of the member 7 by supports 15 and extending along the entire circumference thereof is a stationary slip ring 16. This ring, the purpose for which will hereinafter be more fully explained, is connected in a conventional manner with a third sparking coil.

The induction valve rotor 4 comprises a radially symmetrical body member 18, to which the impeller blades 19 and inlet valves 20 are secured or with which they are integrally formed.

Figure 4:
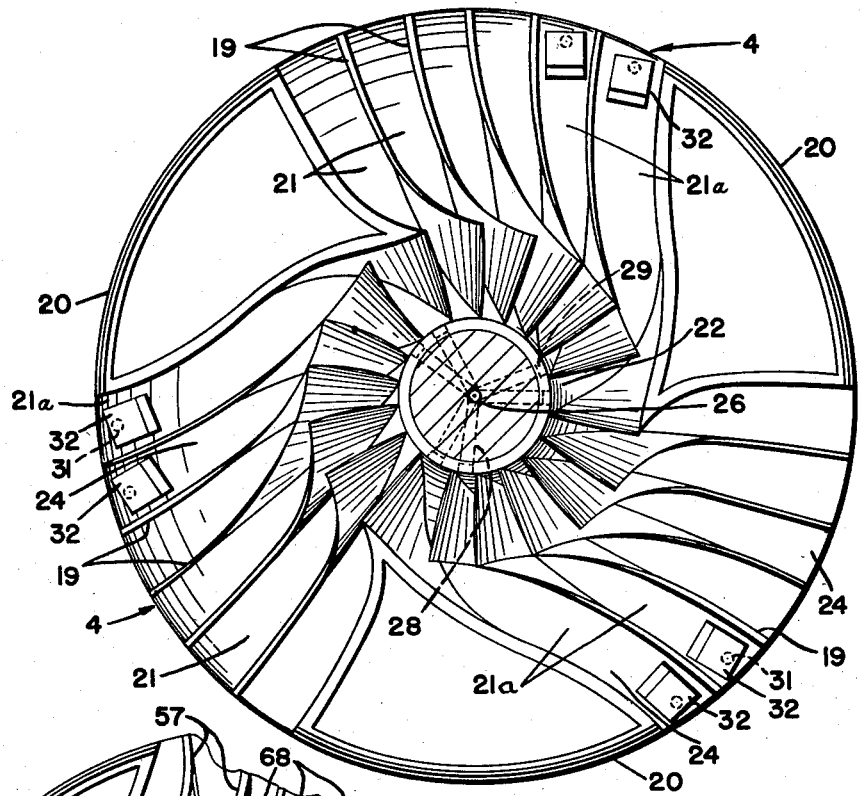
Figure 4 is a front face view of an induction valve rotor adapted for use in a turbine embodying a preferred form of my invention and showing a representative blade and valve arrangement.

The number of inlet valves 20 corresponds to the number of cycles or explosions which it is desired to have in each combustion chamber 9 during each revolution of the turbine. A multiple number of cycles per revolution, and therefore of inlet valves, is recommended to reduce bearing loads and aid in balancing the induction valve rotor about its rotational axis. For reasons hereinafter appearing I prefer a multi-cycle operation and have shown a three cycle turbine which as seen in Figures 3 and 4 requires the use of three inlet valves. Whatever the number of inlet valves 20, their center lines, when taken parallel to the rotational axis of the turbine, should lie on equally spaced radii of the induction valve rotor. This aids the structural and operational balance of the induction valve rotor about its rotational axis and insures that the cycles will be of equal duration. The period of each cycle must be of sufficient length to permit substantially complete combustion of the charge. The minimum arcuate surface length of each induction rotor valve is determined by this period and is related to the rotor tip speed of the turbine. For maximum effective cycle pressure and turbine efficiency, I prefer that the rotor tip speed be sufficient to provide a near sonic gas flow velocity as the gases or charge are impelled into the combustion chamber as hereinafter more fully explained. The impeller blades 19 form charge conducting passages 21 (Figures 3 and 4). These passages are open at both ends, the inlet end 22 of each passage having constant communication with the air duct 23 and the outlet ends 24 having respective communication with each chamber 9 of the stator 3.

The passages 21 with their walls comprise the entire periphery of the induction valve rotor at their inlet ends 22, whereas at their outlet ends 24, the periphery of the rotor comprises both the passages 21 and valves 20.

The number of such blades 19 and therefore of passages 21 in each cycle is determined by known aerodynamic principles and depends on the velocity distribution of the gases on the surface of the vanes, and the undesirability of eddies and cross-currents within the passages 21. The number of blades 19 should be sufficient to prevent separation of the gases from the blades without having unreasonably adverse frictional effects on the gas flow. The blades 19 are shaped and oriented so as to impart a maximum velocity of and rate of flow of charge into the combustion chamber. Accordingly I prefer that the shape of the blades approach the aerodynamic optimum within the limits permitted by the use of inductive rotor valves 20 having a sufficient arcuate length to insure proper cycle periods.

A fuel inlet pipe 26 is positioned along the rotational axis and within the body portion 18 of the induction valve rotor 4. This pipe is connected by means of a conventional seal 27 with a fuel supply line. A series of connecting pipes 28 extend radially from the pipe 26 and leads to fuel nozzles 29 located within all or part of the passages 21 near their inlet ends 22. Because of limitations imposed on the operating temperature of a turbine by metallurgical characteristics of presently known metals and alloys it is not possible to charge completely each combustion chamber with a stoichiometric mixture. It is however desirable that the explosion occur in a stoichiometric charge. I have therefore provided a novel means for controlling the operating temperature of the turbine although conventional means could be adapted for use in a turbine embodying other features of my invention. I prefer to accomplish this temperature control by use of novel means for stratifying the charge, as will hereinafter be more fully explained, so as to obtain a substantially stoichiometric explosion without the creation of excessive operating temperatures. For this reason I prefer that only a limited number of passages 21a in each cycle have fuel nozzles 29 within them and function to conduct fuel to the combustion chambers. I have shown two such passages 21a in each cycle. The number of passages 21 having fuel nozzles 29 may be varied to obtain the desired operating temperature, which should be limited only by the characteristics of the metal out of which the turbine is made and the effectiveness of the system, if any, for cooling the turbine or parts or portions thereof. I prefer that the passages 21a containing the fuel nozzles 29 may be at or near the beginning of each cycle, as this will reduce the cycle period, aid in the creation of turbulence in the flame so as to promote rapid combustion and cause the explosion to be obtained or completed near the outlet port, thereby permitting a shorter high pressure period and a consequent reduction in leakage. Additionally the location of the fuel conducting passages 21a at the beginning of each cycle will tend to stabilize the operation of the turbine at the optimum speed and pressure for which it has been set. This will result from the fact that deviations from the optimum speed or pressure will vary the amount of charge received by each combustion chamber from the first passage and the amount will vary so as to correct the deviation. For example, should the pressure within the turbine and chamber rise above optimum, less charge, and consequently less fuel would be impelled into the chamber from the first passage as the flow would be against a higher pressure. The reduction in fuel would result in a smaller explosion and lower resultant pressure, thereby reducing the pressure within the chamber. On the other hand should the pressure within a chamber become less than optimum more charge and fuel would be received into the chamber from the first passage resulting in a larger explosion and a larger resultant pressure. When all of the passages 21 are to conduct fuel and air, the fuel may be added to the air before it enters the passages.

One or more of the passages 21a containing a fuel nozzle 29 is provided with a spark plug or other firing device 31 which is secured to the body portion 18 and from which an electrical lead is in slipping contact with the slip ring 16. This contact may be of any conventional type. A flame holder or shield 32 permits the establishment and stabilization of the flame. The distance within the passage 21a between the plug 31 and the outlet end 24 is a function of the rate of combustion in relation to the cycle period and is determined by the speed and size of the turbine.

The axial extending portion 33 of body member 18 extends beyond the housing 1, through the bearing 2 and is provided with a bearing surface 34 by means of which the induction valve rotor 4 is supported by the bearing 2. The outer end of axially extending portion 33 is provided with a gear 35 which is in driving connection with gear 36 of shaft 37. The shaft 37 is connected in a conventional manner with a starter, generator and timers (not shown).

The opposite end of axially extending portion 33 of body member 18 may terminate along the rotational axis at a point just short of the plane of the radial centerline of the stator 3. A threaded recess 41 is provided within portion 33 of member 18 at and along the rotational axis thereof for reception of the draw bolt 42. The rear face 43 of the body portion 18 is provided with a substantially radial portion 44 which is interlocked as by radially extending splines 45 with a corresponding portion of the exhaust valve rotor 5. The rear face 43 is also conveniently provided with an inclined portion 46 the end of which may be aligned with the inlet port end of stator inner member 7 and the purpose of which will hereinafter be explained.

Extending forwardly from the housing is an air duct 23. The diameter of the duct is held to a minimum to provide for a maximum of centrifugal compression by the induction rotor without however bringing the inlet flow velocity too close to sonic speed. The duct 23 comprises an outer wall 49 and an inner wall 50. For the purposes hereinafter explained, I prefer that the air duct be provided with a throttle as at 51. The outer wall is in effect a continuation of the housing 1. The inner wall extends within the turbine housing a distance sufficient to permit the provision of struts 52 and guide vanes 53 within the air duct but without interfering with the aerodynamic design of the impeller blades. A shoulder 48 on axially extending portion 33 of member 18 permits the alignment of the air duct 23 with the passages 21. The struts 52 are secured to the housing 1 and support both the air duct inner wall 50 and the bearings.

The guide vanes 53 aid in setting the relationship between power input to the gas and impeller discharge rotational velocity by imparting a whirl component of velocity to the air before it enters the rotor passages 21.

A seal 54 may be provided between the inlet valves 20 and the housing 1 to reduce leakage from each combustion chamber while the inlet valve is closed.

Figure 5:
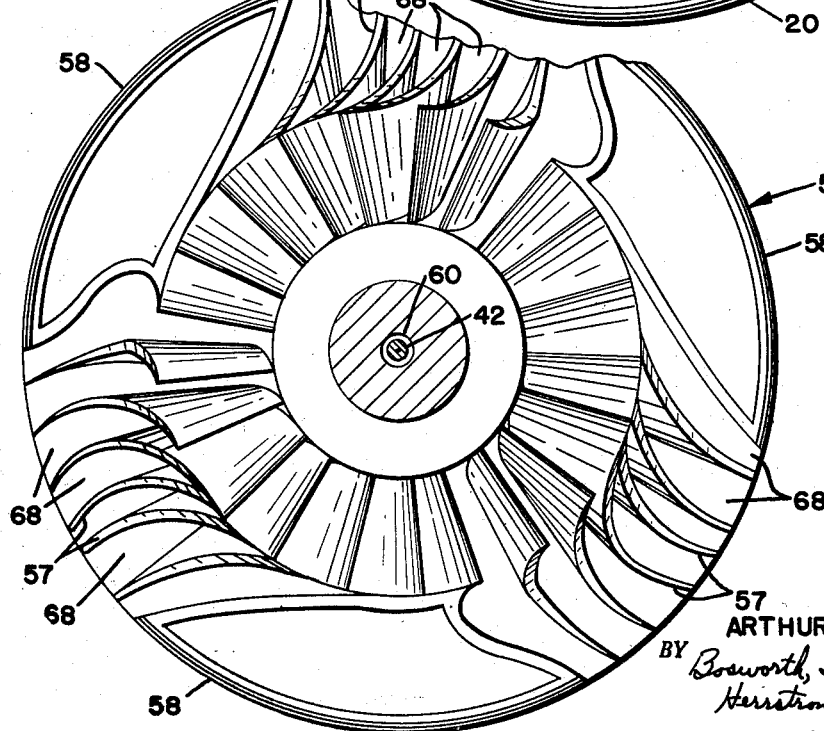
Figure 5 is a front face view of an exhaust valve rotor adapted for use in a turbine embodying a preferred form of my invention and showing a representative blade and valve arrangement.

The exhaust valve rotor 5 comprises a radially symmetrical body member 56 to which the exhaust blades 57 and valves 58 are secured (Figure 5). The body member 56 has an axially extending portion which is provided with bolt hole 60 for the reception of draw bolt 42 and, at its end remote from the induction rotor 4, a bearing surface 61 upon which the bearings 2a support the exhaust valve rotor 5.

The rear face 62 of the exhaust valve rotor 5 preferably has a radial portion 63 which is interlocked as by radially extending splines 64 with the surface 44 of the induction valve rotor. A ring 65 maintains the rotors in correct alignment. This interlocking means not only is strong enough to withstand the shearing forces acting in the area of contact between the rotors and therefore insure that the rotors will turn in fixed relation to each other, but also permits a relatively simple adjustment of the relation between the rotors and therefore of the timing of the cycle during manufacture and assembly of the turbine. The inclined portion 66 of the rear face 62 may terminate in alignment with the outlet end of the stator inner member 7. The divergence of the surfaces 46 and 66 provides space for the slip ring 16.

The exhaust valves 58 are equal in number to the inlet valves and their radial centerlines are spaced equiangularly about the rotational axis of the turbine. The arcuate length of the exhaust valves depends on the period of the cycle and should be at least sufficient so as not to open the outlet port 12 of the combustion chamber 9 before the pressure at the outlet port has substantially reached a maximum, and after exhaustion of the combustion gases, to close the port at such a time that the resulting shock compression wave reaches the inlet port 11 after the mass efflux of combustion gases has been replaced by a substantially equal mass influx of charge, as will hereinafter be more fully explained.

The exhaust blades 57 form discharge or exhaust gas conducting passages 68 through which the high pressure and temperature gases are conducted to the turbine exhaust duct 69.

The exhaust valve rotor is designed to extract energy from the gas and to smoothly guide the gas from the combustion chambers 9 to the exhaust duct 69. The orientation, number and shape of the exhaust blades (and therefore of the exhaust passages 68) is therefore a function of the velocity vector of the gases relative to the rotor and the amount of energy to be extracted from the gases by the blades 57. The amount of energy to be extracted by the exhaust blades depends on whether the turbine is to be used as a direct source of power or as a source of high pressure and temperature gases for driving a second power turbine. The exhaust blades 57 diverge radially from each other as they approach the exhaust duct 69 with the result that the entire periphery of the exhaust valve rotor 5 which is in contact with the exhaust duct comprises the outlet ends 71 of the passages 68 and the blades 57 which form them.

The housing 1 extends beyond the plane in which the outlet ends of the blades 57 and passages 68 terminate a sufficient distance to permit the location and proper supporting of bearing 2a within the housing.

As previously stated the outlet ends 71 of passages 68 are in continuous communication with the exhaust duct 69. The outer wall 76 of the exhaust duct is in effect a continuation of the housing 1. The inner wall 78 of the exhaust duct extends within the housing and terminates in alignment with the outlet ends 71 of passages 68.

A seal 79 may be provided between the exhaust valves 58 and the housing 1, to reduce leakage of the gases from each combustion chamber while the outlet port is closed.

Struts 81 are secured to the housing 1, and support both the inner wall 78 of the exhaust duct 69 and the bearings 2a.

In general, air, which may or may not be under pressure, enters the turbine through the duct 23 and throttle 51 and passes through guide vanes 53 into each of the charge conducting passages 21 of the induction valve rotor. Simultaneously fuel is continuously injected through the nozzles 29 into each of passages 21a, the amount of fuel so injected being sufficient to form a substantially stoichiometric mixture with the air entering the same passage. The induction valve rotor compresses the air or fuel and air mixture and changes the flow from axially symmetrical time steady to axially asymmetrical time steady in such a manner that over part of the arcuate discharge periphery of each cycle of the rotor substantially no flow occurs and over the remainder the discharge direction and velocity is varied to obtain maximum charge induction to the combustion chambers without undue loss of efficiency.

The flow of air or air and fuel in passages 21 or 21a is substantially continuous as the gas flow is stopped in the combustion chamber and not in the rotor. The continuous gas flow within the rotor is however changed to a pulsating flow within the combustion chamber as will hereinafter more fully appear.

A portion of the charge in each combustion chamber is successively obtained from each of the passages 21 within a cycle of the induction valve rotor, and the charge within the combustion chamber is thereby stratified. Thus, within the combustion chamber that portion of the charge nearest the outlet port 12 will have come from the first passage 21 of the cycle, the portion of the charge once removed from the outlet port will have come from the second passage 21 of the cycle and so on, each passage as aforesaid in the cycle contributing a portion of air or air and fuel to the charge in each combustion chamber. When as I prefer the passages 21a conducting the fuel are the first within a cycle, each charge within said chamber will comprise strata of two different characteristics, those strata nearest the outlet port being a stoichiometric mixture of air and fuel and the remaining strata being air only. By stratifying the charge, I obtain the benefits of a stoichiometric explosion while the mixing of the strata by the explosion aids in maintaining the operating temperature of the combustion chambers and turbine below that at which the metals forming the same will fail. The inlet rotor valve 20 opens the inlet port 11 and flow of charge into the combustion begins as soon as the pressure at the inlet end of the combustion chamber reaches the level of that in the induction rotor. After charging, the inlet port 11 is closed as the inlet valve passes over it and combustion is substantially completed within the combustion chamber as a constant volume process. After the pressure at the outlet end of the combustion chamber has substantially reached its maximum value, the exhaust valve 58 opens the outlet port 12 and the combustion gases are exhausted at high pressure, temperature and velocity against the exhaust rotor blades 57 and thence through the passages 68 to the exhaust duct 69.

The flow of gases against the blades 57 causes the exhaust valve rotor 5 to turn and with it the interconnected induction valve rotor 4. As previously stated, the amount of energy extracted from the exhaust gases by the exhaust blades depends on whether the particular turbine is used as a power turbine itself or merely as a source of high pressure and temperature gases for driving another turbine.

The exhaust rotor blades continuously receive impulses of exhaust gases from the successive combustion chambers and convert the pulsating flow from the chambers 9 into substantially steady flow.

The timing of the cycle, relative location and arcuate length of the rotor valves and the utilization of the pressure waves within the combustion chamber may best be understood by referring to Figure 3 wherein a complete cycle of the turbine is shown with the direction of rotation of the rotors indicated by the arrow.

Upon completion of combustion and after the pressure at the outlet end of the combustion chamber has substantially reached its maximum value, the trailing edge of the exhaust valve rotor 58a opens the outlet port and the gas is exhausted at high pressure and temperature into the exhaust 68 at initial exhaust velocity suitable for obtaining the objects of my invention in view of the disclosure thereof.

The expansion wave resulting from the opening of the exhaust valve at A travels to the inlet side of the combustion chamber and rebounds, as at B, from the inlet valve to the point C on the outlet side of the combustion chamber. There is an immediate drop in pressure at the outlet port when the exhaust valve is opened. Additionally, there is a pressure drop from B to F on the inlet side of the combustion chamber and from C to D on the outlet side. The exhaust flow is stopped by the passage of point D (the leading edge of the next exhaust valve) soon after the rebounded expansion wave BC has reached the point C and before there has been a substantial variation from point C in the useful energy conditions at the outlet port so as to prevent the equalization of the pressures in intake and exhaust passages: Point D closes the outlet port before the inflowing charge begins to flow through the outlet port and the timing and arrangements of parts is such that the resulting compression shock wave DG will reach the inlet port at a point G after closure of the inlet port by the leading edge of the inlet valve (as at H). As shown in Figure 3, when the points C and D are close together or coincident the high exhaust pressure is not transmitted to the inlet port before the port is closed by valve edge H, and the exhaust gases are therefore discharged at a higher pressure than the pressure of the inflowing gases.

The trailing edge F' of the inlet valve 20a opens the inlet port as soon as the pressure has dropped to a level low enough for the inflow to be established. The interface between the fresh charge and the residual gas in the combustion chamber extends from point F and does not, during a single cycle, reach the outlet port.

I prefer that the charging start as soon as possible in order to raise the maximum pressure of the cycle, and do, therefore, prefer the use of a centrifugal impeller type of induction valve rotor, as shown.

Upon the opening of the inlet valve, the charge is impelled into the combustion chamber initially at relatively high pressure and low velocity and later at lower pressure and higher velocity because of the effect of the expansion waves originating at the outlet port, a portion of the charge in each chamber coming from each of the passages 21 as hereinbefore described and the total mass influx being equal to the total mass efflux.

As the exhaust flow is stopped by the action of the leading edge of exhaust valve 58b, a pressure wave is formed at D and travels toward the inlet port, arresting the motion of the flowing gases as it passes them. The inlet port is closed, however, at point H by the leading edge of the inlet valve 20b before the pressure wave reaches the inlet side of the chamber 9 and, accordingly, the wave strikes the inlet valve as at G. The "ramming" effect raises the effective operating pressure and therefore the efficiency of the turbine.

The charge is ignited, whether continuously within the passages 21a or intermittently within the combustion chambers, at such a time as to insure that the main pressure wave resulting from the explosion will not interfere with the induction of the charge into the combustion chamber, but will reach the inlet side of the chamber after the inlet valve 20b has closed the port.

For maximum efficiency I prefer that the maximum velocity of induction of charge into and exhaustion of combustion gases out of the combustion chambers should be close to sonic speed. The high speed of induction and exhaustion is preferred to provide a greater fresh charge in each cycle without scavenging thereby providing a lower precumbustive temperature and a greater temperature rise upon combustion without exceeding the temperature limits of the apparatus so as to provide a maximum output pressure in accordance with the objects and disclosure of this invention.

The operation of the turbine has been described at normal operating speeds. To start the turbine, an auxiliary starting motor is utilized. This motor, as previously explained, drives shaft 37 which in turn acts through gears 35 and 36 to turn the turbine rotors. As the starting motor imparts only a relatively slow speed to the rotors, the explosion is of relatively short duration compared to the cycle period and, accordingly, ignition is initially obtained by means of the spark plugs 13 and then as the speed increases by the plugs 14 and finally by the plugs 31 within the passages 21a.

While choice of wheel rotative speed is not unique, high linear tip speeds tend to aid the charging of the combustion chambers and to increase maximum cycle pressure and overall efficiency; however, my invention is also useful for relative low wheel rotative speed explosion turbines provided the linear rotor tip speeds thereof are sufficiently high. Whatever the chosen operating speed, I prefer that it should be substantially constant once the turbine has been started and the operating speed has been obtained, since the timing of the cycle and orientation of the vanes and blades is dependent in part on the designed operational speed. Accordingly, I prefer that the exhaust valve rotor 5 only extract sufficient energy from the combustion gases to revolve the turbine rotors at their operational speed and that the combustion gases then be led to a second variable speed power turbine to accomplish their work. However, in those instances where a constant speed turbine is useful, the exhaust valve rotor could advantageously extract all the energy possible from the combustion gases.

When a turbine embodying my invention is used as a source of high pressure gases, the pressure level input to the power turbine may conveniently be regulated by the use of the throttle 51. The use of the throttle 51 permits the pressure level at which the explosion turbine is operated to be varied with a resultant corresponding variation in the amount of fuel supplied to each combustion chamber and in the head of the exhaust gases.

Figure 6 is a schematic longitudinal section of a modified form of my invention embodying substantially the same principles and modes of operation as hereinbefore described. However in the modified form shown the inlet and outlet ports 101 and 102 respectively of the combustion chambers 103 lie in planes perpendicular to the axis of rotation of the turbine, and the induction valve rotor 104 and exhaust valve rotor 105 co-operate with the inlet port 101 and outlet port 102 respectively in similar planes respectively. A connector member 106 may be used to aid in connecting the rotors in fixed relationship.

Although I have illustrated and described a specific form of my invention and a turbine embodying the same, various changes and modifications will occur to those skilled in the art, all within the precepts of my invention, and I do not care to be limited in the scope of my patent to the precise embodiments herein particularly illustrated and described nor in any manner inconsistent with the progress by which my invention has promoted the art.

I claim:

1. A constant volume gas explosion turbine comprising a housing, a stator, an induction valve rotor, an exhaust valve rotor for receiving the combustion products, and means for supporting said rotors in fixed relative positions for rotation together relative to said stator and housing, said stator having a plurality of annularly arranged combustion chambers having side walls and mutually adjacent inlet and outlet ports respectively, said induction valve rotor comprising a centrifugal impeller and having a plurality of arcuately spaced inlet valves of arcuate length corresponding to the arcuate length of a plurality of said inlet ports for closing said inlet ports successively, keeping each inlet port closed a predetermined period of time and then opening said inlet ports successively and also, having a plurality of intake passages having inlet and outlet ends, the outlet ends of a portion of said intake passages comprising a group and being disposed between each pair of arcuately adjacent inlet valves, the outlet end of each said intake passage being juxtaposed to said stator and being in constant communication with at least one of said inlet ports and being adapted to communicate directly with said inlet ports successively, each said inlet valve and adjacent group of intake passages comprising a cycle of said turbine, said inlet ends of said intake passages comprising the entire 360° periphery of said induction valve rotor at said inlet ends of said intake passages and being in communication with inlet air, said housing enclosing said intake passages intermediate said inlet and outlet ends thereof and adjacent said outlet ends thereof, means for supplying fuel to at least a part of said intake passages in each group, said intake passages being adapted to impel a charge into said combustion chambers, a portion of the charge in each said chamber coming from a plurality of said intake passages within a cycle, said exhaust valve rotor comprising a centripetal impeller and having a plurality of arcuately spaced outlet valves equal in number to the number of inlet valves on said induction rotor and of arcuate length corresponding to the arcuate length of a plurality of said outlet ports for closing said outlet ports successively, keeping each outlet port closed a predetermined period of time and then opening said outlet ports successively, and also having a plurality of exhaust passages having inlet and outlet ends, the inlet ends of a portion of said exhaust passages comprising a group and being disposed between each pair of arcuately adjacent outlet valves, the inlet end of each said exhaust passage being juxtaposed to said stator and being in constant communication with at least one of said outlet ports and being adapted to communicate directly with said outlet ports successively, each said outlet valve and adjacent group of exhaust passages also comprising a cycle of said turbine, said outlet ends of said exhaust passages comprising the entire 360° periphery of said exhaust rotor at said outlet ends of said exhaust passages, said housing enclosing said exhaust passages intermediate said inlet and outlet ends thereof, said walls of each said chamber adjacent said inlet port thereof being substantially parallel with the direction of flow of charge as it enters said chamber and adjacent said outlet port being oriented to discharge the combustion products as a turbine nozzle and means to ignite the charge in each said chamber.

2. A constant volume gas explosion turbine comprising a stator and rotor means, said stator comprising a plurality of annularly arranged combustion chambers having inlet and outlet ports and side walls, said rotor means including a centrifugal impeller having a plurality of inlet valve means adapted to close said inlet ports successively, maintain each port closed a predetermined period of time and open each port successively and a plurality of intake passages having inlet and outlet ends, the outlet end of each said intake passage communicating successively with said inlet ports and being in constant communication with at least one inlet port, said inlet ends of said intake passages comprising the entire 360° periphery of said rotor means at said inlet ends of said intake passages being in communication with inlet air, means enclosing said intake passage intermediate said inlet and outlet ends thereof, said rotor means also including a centripetal impeller comprising a plurality of exhaust valve means and a plurality of exhaust passages, said exhaust valve means being adapted to close said outlet ports successively, maintain the same closed a predetermined period of time and then to open said outlet ports successively, said exhaust passages having inlet and outlet ends, the inlet end of each said exhaust passage communicating successively with the said outlet ports and being in constant communication with at least one said outlet port, said outlet ends of said exhaust passages comprising the entire 360° periphery of said rotor means at said outlet ends of said exhaust passages, means enclosing said exhaust passages intermediate said inlet and outlet ends thereof, means to supply fuel to said chambers and means to ignite the charge in each chamber said inlet and outlet valve means having a fixed cyclic relation whereby to utilize the pressure waves created within said chambers to effectively increase the pressure of the gases passing therethrough, the flow of charge in said intake passages and immediately upstream thereof being substantially steady and in said chambers being pulsating and the flow of exhaust gases in said exhaust passages and immediately downstream thereof being substantially steady.

3. A constant volume gas explosion turbine including stator means having a plurality of valved constant volume combustion chambers with inlet ports, rotor means having inlet passage means and valve means, said valve means controlling the opening and closing of said inlet ports, said inlet passage means communicating directly and successively with said inlet ports and conducting combustible charge to said chambers respectively, and ignition means for igniting said charge for each said chamber prior to passage of said charge from said inlet passage means into said constant volume combustion chambers.

4. In a gas explosion turbine a stator and an induction valve rotor, said stator comprising a plurality of annularly arranged combustion chambers having mutually adjacent inlet ports, said induction valve rotor comprising a plurality of spaced inlet valves adapted to close the inlet ports of said combustion chambers successively and to keep each inlet port closed a predetermined period of time and then to open said inlet ports successively and also comprising a plurality of intake passages adapted to supply a charge to said combustion chambers and having inlet and outlet ends, the outlet end of each of said intake passage communicating with the inlet port of each of said combustion chamber successively and being in constant communication with at least one said inlet port, a certain number of mutually adjacent intake passages comprising a group and having their outlet ends disposed between arcuately adjacent inlet valves, means to each supply inlet air to said passage, means to supply fuel in stoichiometric proportion to a part of said passages in each said group, the charge in each said chamber coming from a plurality of passages in a said group including at least a portion of said fuel supplied passages and at least a portion of the other said passages in said group and means to ignite the charge in each said chamber.

5. The method of cyclically exhausting and charging a constant volume gas explosion turbine combustion chamber having valved inlet and outlet ports to raise the pressure of the gases passing therethrough comprising the steps of completing the explosion of a charge within a combustion chamber with the ports closed, opening the outlet port when the pressure rise thereat is substantially completed thereby creating an expansion wave traveling toward the inlet port and exhausting the gases rebounding the expansion wave from the closed inlet port, opening the inlet port when the pressure thereat becomes lower than the pressure of the incoming charge, impelling a combustible charge into said chamber, closing the outlet port after said expansion wave has rebounded thereto and before there has been a substantial variation in the useful energy conditions thereat, thereby preventing equalization between the charging and exhausting pressures, stopping the flow of gases in the combustion chamber to create a rebounding pressure wave, and closing the inlet port before the rebounding pressure wave reaches the same.

6. In a constant volume gas explosion turbine, a stator and an induction valve rotor, said stator having a plurality of annularly arranged combustion chambers having mutually adjacent inlet ports and outlet ports, said induction rotor comprising a centrifugal impeller, said impeller having a plurality of arcuately spaced inlet valve means and a plurality of intake passages, said inlet valves being adapted to close said inlet ports successively, to maintain the ports closed a predetermined length of time and to open said ports successively, said intake passages having inlet and outlet ends and being adapted to conduct charge to the chambers, a portion of said outlet ends being disposed between each pair of adjacent valves, said outlet ends being in direct communication with said ports successively, each said outlet end being in constant communication with at least one said port, said inlet ends being in communication with inlet air, means enclosing said intake passages intermediate said inlet and outlet ends thereof, and means to cyclically control said outlet ports relative to said inlet ports to close said outlet ports respectively before the charge is impelled therethrough, said centrifugal impeller having the capacity to impart a speed greater than one-half the speed of sound to a major portion of the charge conducted to each said chamber.

7. In a constant volume gas explosion turbine a stator and an exhaust valve rotor, said stator comprising a plurality of annularly arranged combustion chambers having inlet ports and mutually adjacent outlet ports, said exhaust valve rotor comprising a plurality of spaced exhaust valves and a plurality of exhaust passages having inlet and outlet ends, a certain number of exhaust passages comprising a group and having their inlet ends mutually adjacent and disposed between arcuately adjacent exhaust valves, the inlet end of each of said exhaust passages successively communicating with the outlet port of each of said combustion chambers and being in communication with at least one of said combustion chambers at all times, means enclosing said exhaust passages intermediate said inlet and outlet ends said outlet ends of said exhaust passages comprising substantially the entire 360° periphery of said exhaust rotor at said outlet ends of said exhaust passages.

8. The turbine according to claim 7 with said exhaust valve rotor comprising a centripetal impeller.

9. The turbine according to claim 3 in which said rotor means includes means adapted to impel a major portion of said charge into said combustion chambers at a speed greater than one-half the speed of sound.

10. The method of claim 5 wherein the said charge is ignited before being impelled into the combustion chamber.

11. The turbine according to claim 1 in which said fuel supply means is carried by said induction valve rotor and said fuel is supplied directly to at least a part of said intake passages and said ignition means is carried by said induction valve rotor and disposed within at least a portion of said intake passages to which fuel is supplied by said fuel supply means, and said charge is ignited prior to entry into said combustion chambers respectively.

12. The method according to claim 5 in which a major portion of said charge is impelled into said chamber at a speed greater than one-half the speed of sound.

References Cited in the file of this patent

UNITED STATES PATENTS

| | | |
|---|---|---|
| 1,077,314 | Stern | Nov. 4, 1913 |
| 1,164,091 | Herz | Dec. 14, 1915 |
| 1,255,852 | Bengtson | Feb. 12, 1918 |
| 1,395,995 | George | Nov. 1, 1921 |
| 1,421,632 | Wedig | July 4, 1922 |
| 2,010,020 | Holzwarth | Aug. 6, 1935 |

(Other references on following page)

UNITED STATES PATENTS

| | | | |
|---|---|---|---|
| 2,326,072 | Seippel | Aug. 3, | 1943 |
| 2,399,394 | Seippel | Apr. 30, | 1946 |
| 2,423,183 | Forsyth | July 1, | 1947 |
| 2,567,079 | Owner et al. | Sept. 4, | 1951 |
| 2,579,321 | Kadenacy | Dec. 18, | 1951 |
| 2,593,523 | Bauger | Apr. 22, | 1952 |
| 2,630,676 | Seifert | Mar. 10, | 1953 |
| 2,659,198 | Cook | Nov. 17, | 1953 |
| 2,705,867 | Lewis | Apr. 12, | 1955 |

FOREIGN PATENTS

| | | | |
|---|---|---|---|
| 544,778 | France | July 3, | 1922 |
| 473,133 | Great Britain | Oct. 1, | 1937 |
| 467,630 | Great Britain | June 21, | 1937 |
| 656,337 | Great Britain | Aug. 22, | 1951 |